United States Patent [19]
Fukuda

[11] 3,931,731
[45] Jan. 13, 1976

[54] FLUX METER

[76] Inventor: Akira Fukuda, 2-22-8 Kasuga-cho, Nerima, Tokyo, Japan

[22] Filed: May 22, 1974

[21] Appl. No.: 472,399

[30] Foreign Application Priority Data
May 25, 1973 Japan.............................. 48-59097

[52] U.S. Cl.................................... 73/40; 73/49.2
[51] Int. Cl.².......................................... G01M 3/16
[58] Field of Search................ 73/40, 49.2, 3, 194 E

[56] References Cited
UNITED STATES PATENTS
3,028,750  4/1962  Rondeau............................. 73/40 X
3,537,303  11/1970  Hecht, Sr............................. 73/3 X

*Primary Examiner*—Jerry W. Myracle
*Attorney, Agent, or Firm*—William Anthony Drucker

[57] ABSTRACT

A comparison-type flux meter for works such as nozzles or the like has an output elimination circuit in cooperation with a DC amplifier receiving output of a differential pressure transducer inserted in the main pipe line. Measurement error is minimized and reading of deviation of works to standards is accurate and rapid.

1 Claim, 1 Drawing Figure

U.S. Patent  Jan. 13, 1976  3,931,731
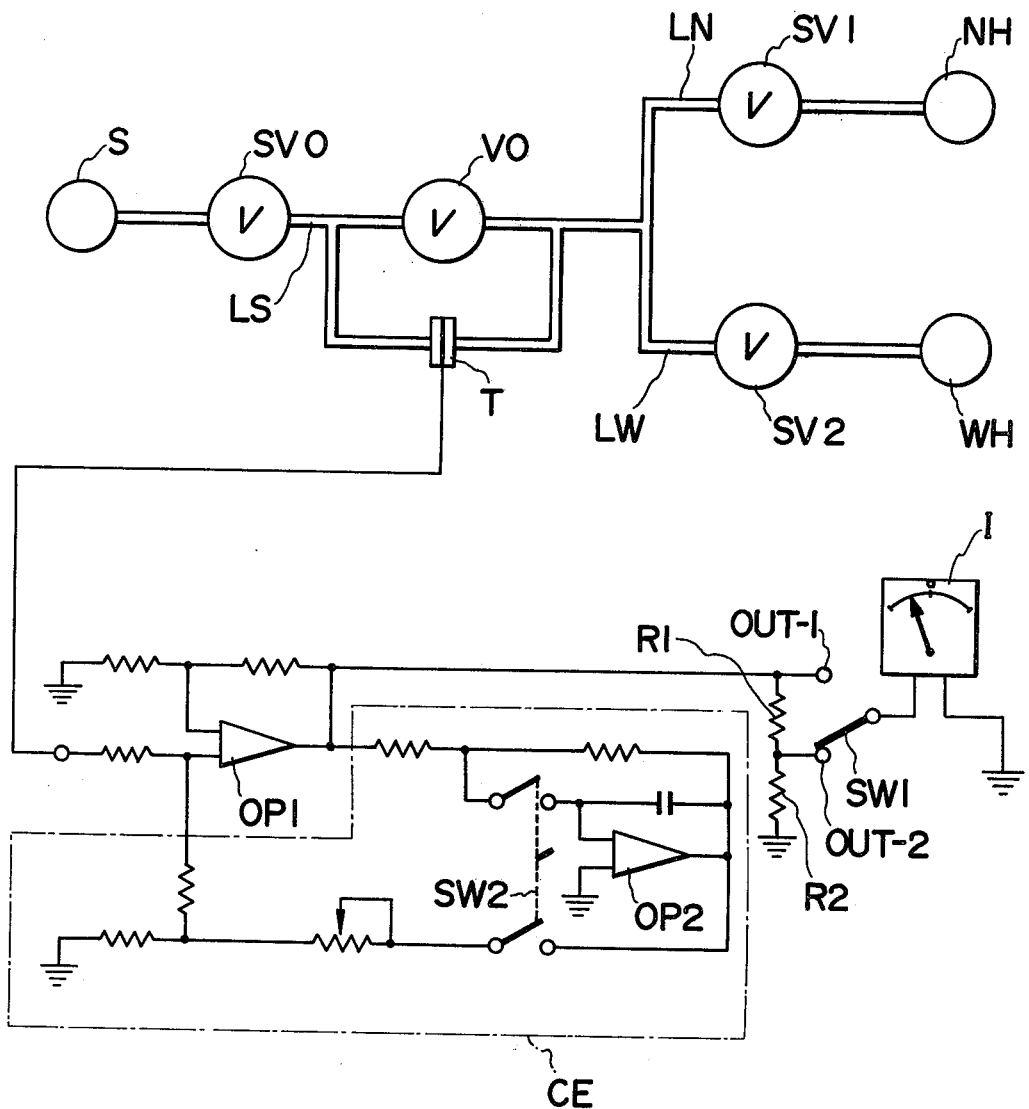

FLUX METER

This invention relates to comparison-type flux meters for the measurement of flux rates of nozzles under constant hydraulic pressures, or for the examination of fluid-tight containers such as watch cases or the like.

It is an object of this invention to provide means to make the above-mentioned measurement or the examination accurate and rapid.

It is another and more specified object of this invention to provide means to minimize measurement errors due to unexpected change in piping element constants in the measurement apparatuses.

It is a further object of this invention to provide means to make zero-adjustment of indicators easy in the measurement operations.

Still further objects and merits of this invention will become apparent from the following description taken in connection with the accompanied sole drawing in which:

The sole FIGURE is shown in a schematic connection diagram of an embodiment of this invention.

In the FIGURE, S is a hydraulic pressure source such as an air compressor or a vacuum apparatus supplying substantially constant pressure or vacuum. An end of main pipe line LS which has an orifice valve V0 inserted therein is connected to said hydraulic pressure source S. SV0 is an electromagnetic valve for opening and closing hydraulic pressure sources to main pipe line LS. Another end of main pipe line LS branches off to a first branch line LN and a second branch line LW. First branch line LN extends through a first electromagnetic valve SV1 to an end NH to which end is to be connected a standard. Second branch line LW extends through a second electromagnetic valve SV2 to an end WH to which end is connected a work to be tested. At the inlet and outlet sides of orifice valve V0, main pipe line LS branches off respectively to an inlet and another inlet of a differential pressure transducer T. The output terminal of transducer T is connected to the input terminal of DC amplifier OP1. The chain line enclosure shown at CE is an output elimination circuit for eliminating output of amplifier OP1 in co-operation therewith.

Said circuit CE in an embodiment shown in the FIGURE is designed such as follows: Upon switch SW2 being turned on, an amplifier OP2 is activated. The output of amplifier OP2 which is of a polarity opposite to that of the output of amplifier OP1 is fed back to the input terminal of amplifier OP1. This results in elimination of output anticipated normally of amplifier OP1. Consequently, a zero-output is detected at the first and second output terminals OUT-1 and OUT-2 which are output terminals of amplifier OP1.

The output elimination circuit CE in this embodiment of the present invention is a so-called reset circuit. However, an output elimination circuit defined in this invention is not limited to said reset circuit, but may be any known circuit by means of which, in co-operation with an amplifier OP1 receiving as input direct current output of transducer T so that an output of said amplifier can finally be eliminated. For example, a circuit composed of a differential circuit and an integral circuit connected in series, said differential circuit input terminal being connected to said amplifier output circuit and the output of said integral circuit being supplied for detection purpose can similarly be used.

Terminals OUT-1 and OUT-2 are respectively the first and second output terminals of amplifier OP1. An output of amplifier OP1, upon opening of switch SW2 as shown in the FIGURE is divided suitably by means of resistors R1 and R2, and a relatively large output value is supplied at terminal OUT-1 and a relatively small output value is supplied at terminal OUT-2. It would be apparent that for means for supplying different values of output of amplifier OP1 at the first and second output terminals OUT-1 and OUT-2, various alternatives to one such as shown in the FIGURE can be designed.

According to this invention, there is provided a change-over switch SW1. Said switch is for switching connection of the input terminal of indicator I over said first and second output terminals OUT-1 and OUT-2. Indicator I has a reading scale for from a negative value through a zero point to a positive value.

Hereunder will be stated fully use of a flux meter according to this invention by taking an air leakage test of an air-tight watch case for an example.

At first, a preliminary adjustment of the flux meter is effected. In the first stage of said preliminary adjustment, the input terminal of indicator I is connected to the second output terminal OUT-2 by means of change-over switch SW1, and switch SW2 is opened so that output elimination circuit CE will be inactivated. Also, gain of amplifier OP1 is adjusted so that the indicator I needle will point a full scale upon a differential pressure of 10 mm water column being given to transducer T. The full scale value of indicator I in this example is 0.3 volts.

In the second stage of said preliminary adjustment, change-over switch SW1 is turned to first output terminal OUT-1, and values of resistors R1 and R2 are adjusted so that indicator I will point the full scale of 0.3 volts upon a differential pressure of 100 mm water column being given to said transducer T. To the above-noted 100 mm water column, given to transducer T, an output value of 3.0 volts which value is ten times the value of output at the first output terminal OUT-1 is to be obtained at the second output terminal OUT-2.

Thus, upon finishing adjustment of output of amplifier OP1 at output terminals OUT-1 and OUT-2, the third stage of said preliminary adjustment is effected. In said third stage of preliminary adjustment, a standard is connected to standard connection end NH and a pressure of a predetermined value which is to be used in the following test of works is supplied thereto from pressure source S. The value of leakage of said standard which has been connected to the connection end NH, that is the value of flux which is to be discharged through said standard under the above-mentioned predetermined pressure value is herein assumed to be 1,000 cc/min.. The input terminal of indicator I is kept connected to terminal OUT-1 when said pressure of predetermined value is given to the standard. And, orifice value V0 is adjusted so that indicator I will point a full scale which corresponds to 0.3 volts. Hereupon, the second output terminal OUT-2 is to be anticipated to give a value of output of 3.0 volts. The preliminary adjustment has thus been finished.

Upon testing works, a work to be tested is connected to work connection end WH. If a considerable length of time has passed since the foregoing preliminary adjustment was effected, it requires a confirmation of correctness of the foregoing adjustment with respect to the standard. Accordingly, as the first stage of the work test operation, a measurement on flux in the standard is to be effected. In this measurement, the input terminal of indicator I is connected by means of switch SW1 to the first output terminal OUT-1, and it is to be confirmed that indicator I points a full scale under said predetermined pressure value. In this stage of operation, switch SW2 is kept open as shown in the FIGURE so that output elimination circuit CE is kept inactivated.

Subsequently, as the second stage of the work test operation, switch SW2 is closed so that said circuit CE is connected to amplifier OP1, as well as switch SW1 is turned to connect indicator I to second output terminal OUT-2. Hereupon, an output of amplifier OP1 eliminated by circuit CE, that is a zero-output, is observed at indicator I.

Then, as the third stage of the measurement operation, first electromagnetic valve SV1 is closed and second electromagnetic valve SV2 is opened so as to change over the pressure supplied by pressure source S from the standard to the work to be tested. If the value of flux in the work tested is equal to the value of flux in the standard, that is both are of a value of 1,000 cc/min., indicator I will point zero. And, if the value of flux in the work tested is of a value of 1,100 cc/min., that is larger by 10 % than the value of flux in the standard, indicator I will be observed at a full scale which corresponds to 0.3 volts. The reason is, because the flux in the work tested is in proportion to the differential pressure given to transducer T, and the output of amplifier OP1 is also in proportion to the same differential pressure, the output of amplifier OP1 results in proportion to the flux in the work tested. And, if without co-operation of circuit CE, an output of a value of 3.3 volts would be supplied to said terminal OUT-2 against the foregoing flux value of 1,100 cc/min. at the foregoing third stage of said preliminary adjustment. Actually however, on account of a co-operation of said circuit CE, an output value of 3.0 volts which corresponds to a flux value of 1,000 cc/min. is eliminated. As the result, an output of 0.3 volts which corresponds to a flux of 100 cc/min. and which is the difference of 1,100 cc/min. and 1,000 cc/min. is supplied to said second output terminal OUT-2.

On the other hand, if a flux in the work tested is of a value of 900 cc/min., that is a value less than the flux in the standard by 10 %, the output which would be supplied to terminal OUT-2 without co-operation of circuit CE would be of a value of 2.7 volts. Actually however, due to the co-operation of said circuit CE, an output of a value of 3.0 volts which corresponds to a value of flux of 1,000 cc/min. is eliminated. Accordingly, an output of a value of −0.3 volts is supplied to said terminal OUT-2, and this negative output makes indicator I point a negative full scale.

The foregoing values of fluxes in standards and works tested as well as the foregoing values of scales of the indicator in relation to said values of fluxes have been assumed by way of explanation. And, said values may naturally be changed freely in actual flux measurement and work test operations. However, it would be most convenient to fix a difference between output values at first and second output terminals OUT-1 and OUT-2 by means of adjusting the output circuit of amplifier OP1 so that an indicator I, upon being connected to second output terminal OUT-2 may point a full scale when there is provided a value of deviation of about 10 % between fluxes in a standard and a work tested. Further, in accordance with this invention, a meter relay connected to an alarm may be inserted in the input circuit of said indicator so as to operate said alarm at a desired input value of said indicator, which operation of said alarm may give notice to operators participating flux measurement and work test operations at a value of flux over an allowable value of flux deviation in works tested.

According to this invention, a measurement error caused by obstacles such as oil and fat or dusts sticking to a portion in the pipe lines which would result in change in pressure supply will not occur, because in a flux meter according to this invention, measured values relate only to comparison of fluxes in said standard and said work to be tested. Also, according to this invention, there is provided a circuit for the elimination of output of an amplifier receiving output of a differential pressure transducer as well as a change-over switch supplying output of said amplifier in different gains to an indicator. Accordingly, as stated in the foregoing, zero point adjustment of the indicator with respect to standards is easy, and reading of values of deviation between fluxes in standards and works tested is quite correct due to magnified scale reading of said deviation. Also, in accordance with this invention, it would be apparent that an automatic grading apparatus on works such as nozzles or air-tight containers can easily be provided by using input of said indicator through the medium of a meter relay as stated in the foregoing so as to operate an apparatus effecting change of works for the testing and grading, control valves in the pipe lines by introducing an appropriate sequence circuit, and control amplifiers and other circuit elements by the same sequence circuit.

Having thus described by invention, what I claim for Letters Patent is:

1. A flux meter which comprises a main pipe line having an end connected to a hydraulic pressure source and extending through an orifice valve, another end of said main pipe line branching off to a first branch line extending through a first electromagnetic valve and having an end for connecting to a work to be tested, a differential pressure transducer having two inlets for connecting to differential pressure means, a said inlet of said transducer being connected to said main pipe line orifice valve inlet side and another inlet of said transducer being connected to said main line orifice valve outlet side, a DC amplifier, an input terminal of said DC amplifier being connected to said differential pressure transducer output terminal, an output elimination circuit connected to said DC amplifier for the elimination of said DC amplifier outputs, a first output terminal for supplying a relatively large value with respect to said DC amplifier output, a second output terminal for supplying a relatively small value with respect to said DC amplifier output, said last-mentioned output being of a value equal to said first-mentioned output, an indicator having a scale indicating from a negative to a positive value, and a change-over switch for changing said indicator input terminal over from said first and second output terminals.

\* \* \* \* \*